United States Patent [19]

Taraci et al.

[11] Patent Number: 5,004,973
[45] Date of Patent: Apr. 2, 1991

[54] METHOD AND APPARATUS FOR MAINTAINING ELECTRICALLY OPERATING DEVICE TEMPERATURES

[75] Inventors: Richard Taraci; Brian Taraci, both of Phoenix; Imre Gorgenyi, Scottsdale, all of Ariz.

[73] Assignee: Thermal Management, Inc., Tempe, Ariz.

[21] Appl. No.: 379,083

[22] Filed: Jul. 13, 1989

[51] Int. Cl.$^5$ .................. G01R 31/02; H01L 23/44
[52] U.S. Cl. .................. 324/158 R; 165/80.4; 324/158 F; 361/385
[58] Field of Search .................. 324/158 R, 158 F; 165/80.4, 104.33; 357/82; 361/385; 123/41.21

[56] References Cited

U.S. PATENT DOCUMENTS

| | | | |
|---|---|---|---|
| 3,741,292 | 6/1973 | Aakalu et al. | 165/105 |
| 3,972,063 | 7/1976 | Kimura et al. | 357/82 |
| 4,050,507 | 9/1977 | Chu et al. | 165/1 |
| 4,260,014 | 4/1981 | Feehan | 165/104.33 |
| 4,312,012 | 1/1982 | Frieser et al. | 357/82 |
| 4,466,746 | 8/1984 | Hancock et al. | 324/158 R |
| 4,630,572 | 12/1986 | Evans | 123/41.21 |
| 4,709,754 | 12/1987 | Chu et al. | 165/80.4 |
| 4,741,385 | 5/1988 | Bergles et al. | 324/158 F |
| 4,745,354 | 5/1988 | Fraser | 324/73 R |
| 4,796,155 | 1/1989 | Saito et al. | 165/104.33 |

OTHER PUBLICATIONS

Shock, R. A. W.; "Nucleate Boiling . . . "; Int. J. Heat Mass Transfer; vol. 20; pp. 701–709; 12/1977.
Yokouchi et al.; "Immersion Cooling . . . "; IEEE Trans. on Components, Hybrids and Manufacturing Technology; vol. CHMT-12; No. 4; Dec. 1987; pp. 643–646.

Primary Examiner—Ernest F. Karlsen
Attorney, Agent, or Firm—Cahill, Sutton & Thomas

[57] ABSTRACT

A method and apparatus for maintaining an electrically operating device at a desired temperature includes immersing the device in a bath of an inert liquid having a boiling point less than the desired device temperature. The device generates heat during electrical operation which is transferred to the bath by nucleate boiling of the liquid. The device temperature is monitored until it stabilizes at a temperature between the boiling point of the liquid and the desired device temperature. An inert liquid having a boiling point greater than the desired device temperature is slowly added to the bath to modify the rate of nucleate boiling of the lower-boiling liquid, while the device temperature is simultaneously monitored, until it reaches the desired device temperature.

20 Claims, 2 Drawing Sheets

METHOD AND APPARATUS FOR MAINTAINING ELECTRICALLY OPERATING DEVICE TEMPERATURES

FIELD OF THE INVENTION

The invention relates generally to a method and apparatus for maintaining an immersed electrically operating device at a desired temperature by controlling the rate of nucleate boiling of the immersion liquid under elevated thermal conditions.

DESCRIPTION OF THE PRIOR ART

Many electrical devices which produce heat during operation have a high percentage failure rate during the first year of service. Such devices include capacitors, resistors, and semiconductor devices including diodes, transistors and integrated circuits. Circuits are of particular concern because advances in semiconductor processing and circuit design have led to increased component density on the circuit, with a consequent increase in heat generated per unit area of semiconductor chip surface.

The majority of the electrical devices that will fail during the first year of operation can, however, be eliminated from commercially available products by subjecting the devices to a "burn-in" test. During a burn-in test the devices are subjected to extreme thermal or electrical operating conditions for a short period of time, typically, one to eight weeks, thereby simulating one year of operation under normal conditions.

Originally, burn-in tests were conducted in air or nitrogen. Recently, however, as disclosed in U.S. Pat. No. 4,745,354 to Fraser, burn-ins have been conducted with the devices immersed in a non-reactive electrically insulating liquid. The liquid serves to increase the ambient operating temperature of the devices and to dissipate excess heat produced by the operating devices. The liquid used in the Fraser process is unusually expensive and has a significant evaporation rate at the elevated temperatures associated with burn-in tests. Therefore, to prevent extensive losses from evaporation, the liquid is carefully maintained below its boiling point by pumping it over mechanical cooling coils to remove heat generated by the operating devices.

Computer manufacturers also use immersion cooling to dissipate heat from semiconductor devices in operating computers. In such cooling systems, the devices are immersed in a dielectric, low boiling point liquid. During operation the heat generated by the devices causes vapor bubbles of the liquid coolant to form in nucleation sites on the surface of the chip. A portion of the heat generated is absorbed as the latent heat of vaporization of the liquid, the remainder being absorbed by the convection of the liquid at the chip surface. The process is called "nucleate boiling".

The following U.S. Patents are representative of nucleate boiling heat transfer methods and apparatus.

| INVENTOR | U.S. Pat. No. |
| --- | --- |
| N. K. G. Aakalu, et al. | 3,741,292 |
| R. C. Chu, et al. | 4,050,507 |
| Frieser, et al. | 4,312,012 |
| R. C. Chu, et al. | 4,709,754 |

In each of the above patents, modules having heat generating components such as semiconductor devices are located within a low boiling point dielectric liquid. A vapor space is located above the liquid level. The electronic components heat the liquid causing nucleate boiling at the surface of the electronic components. The R. C. Chu, et al., U.S. Pat. No. 4,050,507 describes electronic chips having nucleate boiling sites located on at least the back surface of the chip and mounted so that the back surface is exposed and is oriented vertically. The Frieser, et al., U.S. Pat. No. 4,312,012 describes enhancing the nucleate boiling characteristics of silicon devices by forming lattice defects on the backside surface of the device by sandblasting and etching the damaged surface. The R. C. Chu, et al., U.S. Pat. No. 4,709,754 discloses a fin structure with an improved nucleate boiling surface. In general, nucleate boiling cooling technology has been directed at improving the nucleation sites at which boiling commences, rather than maintaining the temperature of the immersion bath or device case.

One problem with nucleate boiling cooling is that the liquids appropriate for immersion cooling exhibit an unexplained hysteresis characteristic, requiring a higher temperature to initiate nucleate boiling than is required to sustain boiling. The superheat required to initiate nucleate boiling may exceed the desired operating temperature of the heat-generating device, potentially damaging it, even though the eventual boiling temperature stabilizes at an acceptable level. The hysteresis effect can be best illustrated by referring to FIG. 1. FIG. 1 is a graph of temperature versus time for the nucleate boiling of immersion fluids. Curve 20 represents the temperature overshoot necessary to initiate nucleate boiling in the immersion fluids used in prior art nucleate boiling cooling systems.

Another problem associated with nucleate boiling cooling is that as heat is dissipated from the device, more and more bubbles are formed, eventually creating a film. The onset of film boiling marks the upper limit of nucleate boiling because the film blocks the liquid from reaching the chip surface, thereby significantly restricting heat transfer from the devices and potentially causing destructive overheating, or thermal runaway, of the devices.

Problems associated with film boiling can be ameliorated by attaching heat sinks to the heat dissipating surface to increase the heat transfer area. U.S. Pat. No. 4,203,129 to Oktay, et al. discloses a heat sink containing tunnels so that the attached devices are cooled by nucleate boiling bubbles formed within the tunnels.

However, manufacturers nowadays require burn-in tests to be performed on electrical devices running at high power while the device case temperature is maintained within a very narrow margin. Presently available systems for doing high power burn-ins are extremely expensive and do not have sufficient control to maintain the case temperature within a narrow tolerance. Such burn-in test requirements cannot be met either by the prior art directed to burn-ins, or the prior art directed to nucleate boiling cooling of semiconductor devices operating in computers.

SUMMARY OF THE INVENTION

The present invention relates generally to a method and apparatus for maintaining electrically operated devices at a predetermined desired temperature by immersing the device in an inert liquid which cools the device by nucleate boiling. The techniques employed by the present invention may be described in the environment frequently found in the semiconductor industry wherein the case temperature of a device is controlled during burn-in. Therefore, the present invention will be described in an environment wherein the temperature of the device is controlled by detecting and controlling the temperature of the case enclosing the device. In such burn-in testing, it is typical for industry burn-in specifications to require the device case to be maintained at a given temperature for an extended period of time; as a practical matter, the case forms a convenient point of attachment for a means to measure temperature.

Briefly described, and in accordance with one embodiment, the invention provides a method for maintaining the case of an immersed electrically operating device at a desired temperature by controlling the rate of nucleate boiling of the immersion liquid during sustained burn-in testing of the device. A heat sink is attached to the device, and the device and heat sink are immersed in a bath of inert liquid having a boiling point lower than the desired case temperature. The device is supplied with electrical power, thereby generating heat which is transferred to the bath by nucleate boiling of the liquid. The device case temperature is monitored until it stabilizes at a temperature between the boiling point of the liquid and the desired case temperature. An inert liquid having a boiling point greater than the desired case temperature is slowly added to the bath to modify the rate of nucleate boiling of the lower-boiling liquid, while simultaneously monitoring the case temperature, until it stabilizes at the desired case temperature.

It is an object of the present invention to maintain within a narrow margin the temperature of an electrically operating device immersed in a boiling inert liquid by controlling the rate of vaporization of the immersion liquid.

It is another object of the present invention to prevent destructive overheating of an electrically operating device immersed in a boiling inert liquid during a burn-in test.

It is another object of the present invention to provide an uncomplicated method and apparatus for maintaining a desired temperature of an electrically operating device undergoing a burn-in test.

It is another object of the present invention to provide an inexpensive method and apparatus for maintaining a desired temperature of an electrically operating device undergoing a burn-in test.

It is another object of the present invention to provide a method and apparatus for recycling the inert liquid.

Other objects, advantages and features of the present invention will become apparent from the following specification when taken in conjunction with the accompanying drawings.

Figure 2:
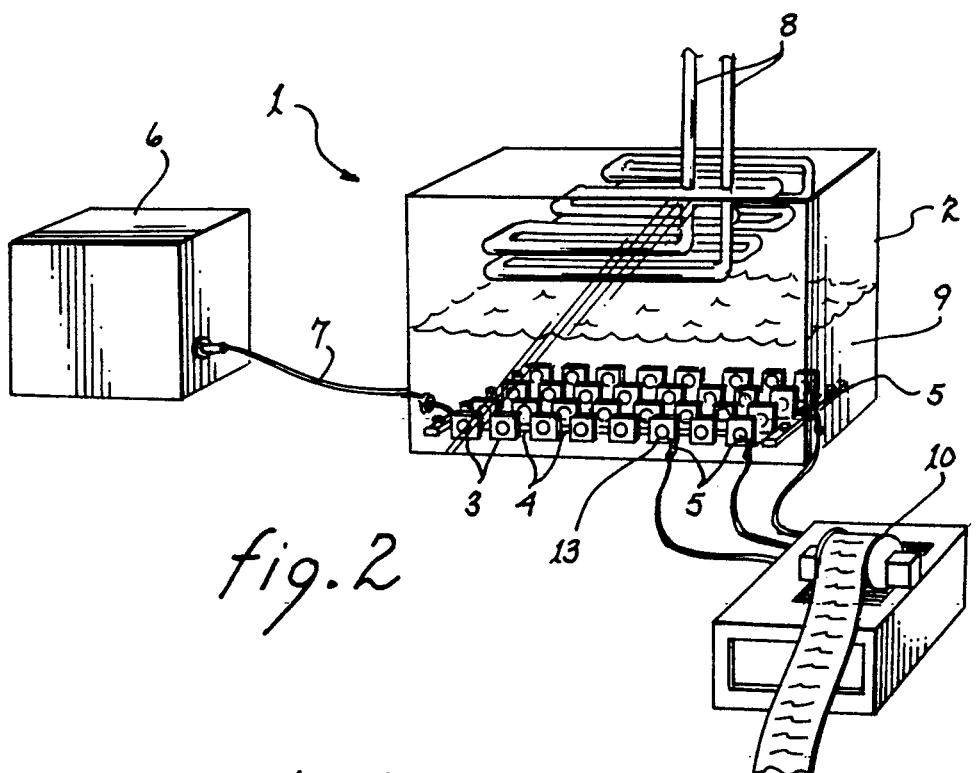
FIG. 2 is a perspective view of a burn-in unit including the present invention.

FIG. is a close-up view of the electrically operating devices tested in the burn-in unit of FIG. 2.

Figure 4:
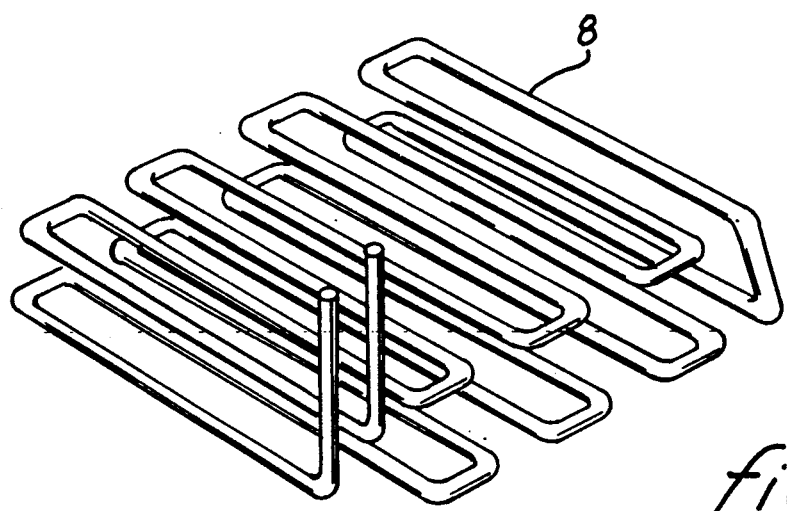

FIG. 4 is a close-up view of the cooling coils used in the burn-in unit of FIG. 2.

Figure 5:
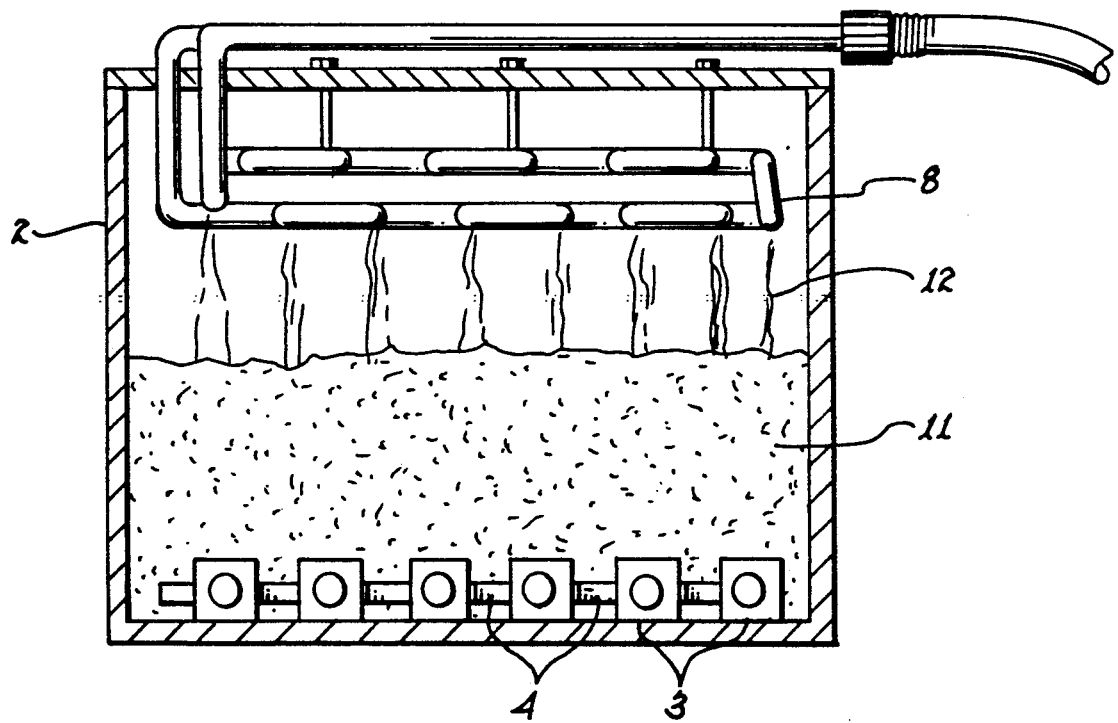

FIG. 5 is a perspective view of the burn-in unit of FIG. 2 in operation.

DESCRIPTION OF THE PREFERRED EMBODIMENT

Referring generally to FIGS. 2, 3, 4, and 5, burn-in unit 1 includes a generally rectangular, substantially closed tank 2 containing transistors 3 to be subjected to a burn-in test. Other devices suitable for burn-in testing according to the present invention include for example rectifiers, resistors and diodes. Transistors 3 are supplied with electrical power from power source 6 by means of electrical cord 7. To monitor the transistor case temperature during the burn-in test, thermocouples 5 are attached to a representative number of transistors 3 at a point on the transistor case 13 nearest the die, or source of heat generation. Thermocouple readings are recorded by temperature recorder 10. Alternatively, the case temperature can be monitored by measuring the infrared radiation given off by transistors 3 during the burn-in test.

Figure 3:
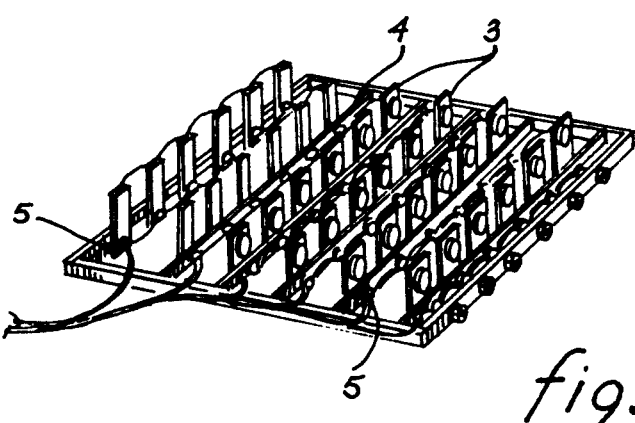

As illustrated in detail in FIG. 3, transistors 3 are attached to copper heat sink 4. Heat sink 4 provides an increased heat transfer area for transistors 3, to prevent destructive overheating or thermal runaway of the transistors and to keep the transistor case temperature uniform. However, heat sinks are not necessary if the particular devices under test transfer heat efficiently. Furthermore, depending on the particular geometry of the device, a heat sink may actually make the device hotter by preventing cooling means from reaching the device.

The transistor/heat sink assembly is immersed in a bath of an inert liquid such as a perfluorinated organic liquid 9, having a boiling point less than the desired burn-in case temperature. Power is supplied to transistors 3 and the temperature of transistor cases 13 is monitored. During operation transistors 3 are cooled by transferring heat to the bath, initiating nucleate boiling of liquid 9, as indicated by reference numeral 11 in FIG. 5. A large portion of the heat transferred from transistors 3 is absorbed by liquid 9 as the latent heat of vaporization; the remainder is absorbed by convection of the liquid. The rising vapor bubbles of liquid 9 are condensed by cold water contained in two rows of ¼ inch copper cooling coils 8 located in tank 2 above the bath (FIG. 4). Condensing liquid streams 12, fall back into liquid bath 9 for continued cooling of transistors 3 by nucleate boiling. It is important that the temperature of the cooling coil be above the dew point of the atmosphere in the tank to prevent water from condensing inside the tank and reacting in the bath with the electrically operating device.

The temperature of transistor cases 13 increases to a stabilization temperature between the boiling point of liquid 9 and the desired case temperature. When the stabilization temperature has been reached, an inert liquid (preferably, a perfluorinated organic liquid miscible with the first liquid) having a boiling point greater than the desired case temperature, is slowly added to tank 2 while the transistor case temperature is continuously monitored. The second, higher-boiling liquid decreases the rate of heat transfer from transistors 3 by diluting the lower boiling fluid, thereby effectively quenching the high heat transfer rate caused by nucleate boiling of the first fluid. Therefore, the transistor case temperature will rise. When the case temperature reaches the desired temperature, addition of the second fluid is discontinued, and the case temperature will remain at the desired temperature.

After the desired case temperature has been reached, the burn-in test continues for the required period of time. The temperature of transistors 3 is closely monitored; if the temperature begins to increase above the desired case temperature, an additional amount of the first inert liquid is added to tank 2 to cool the transistor cases by nucleate boiling of the lower-boiling liquid. If too much of the first inert liquid is inadvertently added, the case temperature will drop below the desired case temperature; in that situation, additional higher boiling inert liquid is added to quench the nucleate boiling cooling from evaporation of the first inert liquid. The desired case temperature can be maintained within a margin of ±5° C. by careful monitoring of the device case temperature and selective addition to the bath of the two inert liquids. When the burn-in test has been completed, and the tested transistors have been removed, the two inert liquids can be separated by the usual distillation procedures and recycled for use in other burn-in tests.

Figure 1:
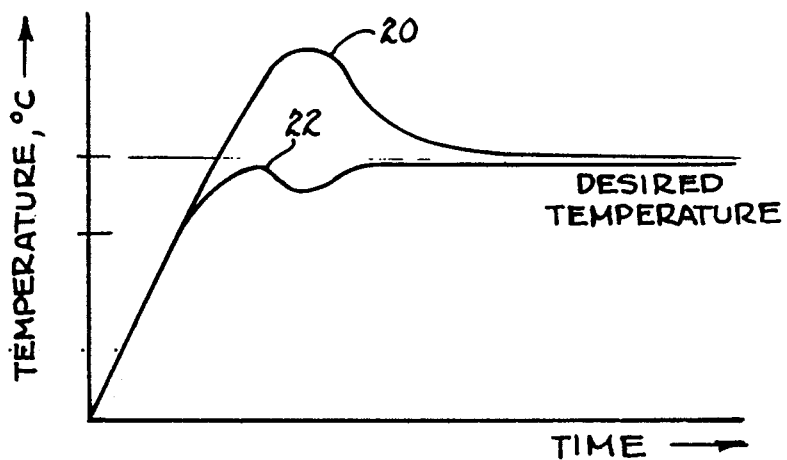
FIG. 1 is a graph useful in comparing the present invention with the prior art.

As indicated by curve 22 of FIG. 1, the present invention avoids the hysteresis and device-overheating problems associated with the prior art because the temperature to initiate nucleate boiling of the lower-boiling immersion fluid is less than the desired case temperature; the higher-boiling fluid in fact does not approach its boiling point.

EXAMPLE

The following example describes a two-week burn-in test of rectifier diodes supplied with 50 watts of electrical power. The required case temperature was 100° plus or minus 5° C. Twenty-two rectifier diodes were attached to copper heat sinks. Thermocouples were attached to three diodes at a point on the diode case nearest the source of heat. The diode/heat sink assembly was then placed in a burn-in tank. A perfluorinated organic liquid having a boiling point of 84° C. (D/80, manufactured by Ausimont Galden), was added to the tank until the diodes were completely immersed. The diodes were supplied with 50 watts of electrical power and the diode case temperature was monitored and recorded. The diode case temperature stabilized at a temperature of approximately 94° C. At that point, a perfluorinated organic liquid having a boiling point of 175° C. ($DO_2$, manufactured by Ausimont Galden), was slowly added to the tank while the diode case temperature was monitored, until it reached the desired case temperature of 100° C. The diode case temperature was monitored for the burn-in period of two weeks; several times, the diode case temperature increased above the desired case temperature of 100° C. To decrease the case temperature to the desired to the desired level, D/80 was slowly added to the tank until the diode case temperature dropped to 100° C. During the burn-in test, vaporized D/80 was condensed by copper cooling coils containing 18° C. water and located above the bath. The condensed D/80 liquid streams dropped back into the bath.

It is to be understood that the present invention is not limited to the particular embodiment disclosed and illustrated herein, but embraces all such modified forms thereof which are within the scope of the following claims.

What is claimed is:

1. A method for maintaining an electrically operating device at a desired temperature during operation of the device, comprising the steps of:
   a. installing the device in a bath of a first inert liquid having a boiling point less than the desired device temperature;
   b. electrically operating the device, thereby generating heat which is transferred to the bath by nucleate boiling of the liquid;
   c. monitoring the device temperature until it stabilizes at a temperature near the boiling point of the first inert liquid and below a desired device temperature; and
   d. adding, incrementally, to the bath a second inert liquid having a boiling point greater than the desired device temperature to modify the rate of nucleate boiling of the first inert liquid while simultaneously monitoring the device temperature until it reaches the desired device temperature.

2. The method of claim 1, further comprising the step of attaching a heat sink to the device to increase the heat transfer rate from the device so as to prevent overheating of the device and to keep the device temperature essentially uniform.

3. The method of claim 1, further comprising the step of recovering vapors of the first inert liquid by condensing the vapors to liquid and returning the liquid to the bath.

4. The method of claim 1, further comprising the step of separating the first inert liquid from the second inert liquid so that both liquids can be reused.

5. The method for maintaining the case of an electrically operating device at a desired temperature during burn-in testing of the device, comprising the steps of:
   a. installing the device in a bath of a first inert liquid having a boiling point less than the desired case temperature;
   b. electrically operating the device, thereby generating heat which is transferred to the bath by nucleate boiling of the liquid;
   c. monitoring the device case temperature until it stabilizes at a temperature near the boiling point of the first inert liquid and below a desired case temperature; and
   d. adding, incrementally, to the bath a second inert liquid having a boiling point greater than the desired case temperature to modify the rate of nucleate boiling of the first inert liquid while simultaneously monitoring the device case temperature, until the case temperature reaches the desired case temperature.

6. The method of claim 5, further comprising the step of attaching a heat sink to the device to increase the heat transfer rate from the device so as to prevent overheating of the device and to keep the device case temperature essentially uniform.

7. The method of claim 5, further comprising the step of recovering vapors of the first inert liquid by condensing the vapors to liquid and returning the liquid to the bath.

8. The method of claim 5, further comprising the step of separating the first inert liquid from the second inert liquid so that both liquids can be reused.

9. Apparatus for maintaining an electrically operating device at a desired temperature during the operation of the device, comprising:
   a. a tank to contain the device while it is being electrically operated;
   b. a first inert liquid having a boiling point less than the desired device temperature, said first inert liquid partially filling the tank and completely covering the device to form a bath;

c. a second inert having a boiling pint greater than the desired device temperature, said second inert liquid being selected to modify the rate of nucleate boiling of the first inert liquid, said second inert liquid being mixed with said first inert liquid;

d. means connected to said device for electrically operating the device, thereby generating heat which is transferred to the bath by nucleate boiling of the first inert liquid; and e. means for monitoring the device temperature.

10. The apparatus of claim 9, wherein the first liquid is a perfluorinated organic liquid.

11. The apparatus of claim 10, wherein the second liquid is a perfluorinated organic liquid.

12. The apparatus of claim 9, further comprising heat sink means attached to the device for increasing the heat transfer rate from the device to prevent overheating of the device and to keep the device temperature essentially uniform.

13. The apparatus of claim 12 wherein the heat sink means is a metal.

14. The apparatus of claim 13 wherein the metal is copper.

15. The apparatus of claim 9, further comprising means for recovering vapors of the first inert liquid.

16. The apparatus of claim 15 wherein the vapor recovering means is a cooling coil located in the tank above the bath which condenses the vapors to liquid for recycling to the bath.

17. The apparatus of claim 9 wherein the device temperature monitoring means is a thermocouple attached to the device near a source of heat.

18. An apparatus for maintaining the case of an electrically operating device at a desired temperature during burn-in testing of the device, comprising the combination of:

a. a tank to contain the device while it is being electrically operated during the burn-in test;

b. a first perfluorinated organic liquid having a boiling point less than the desired case temperature, partially filling the tank and completely covering the device to form a bath;

c. a second perfluorinated organic inert liquid having a boiling point greater than the desired case temperature, selected to modify the rate of nucleate boiling of the first liquid, said second liquid being mixed with said first liquid;

d. means connected to said device for electrically operating the device, thereby generating heat which is transferred to the bath by nucleate boiling of the first liquid;

e. a thermocouple attached to the device case near a source of heat for monitoring the device case temperature;

f. metal heat sink means attached to the device for increasing the heat transfer rate from the device to prevent overheating of the device and to keep the device case temperature essentially uniform; and g. a cooling coil located in the tank above the bath which condenses vapors of the first liquid for recycling to the bath.

19. The method of claim 1 further comprising the step of:

adding, incrementally, to the bath one of said first and said second inert liquids to selectively modify the rate of nucleate boiling of the mixture of said first and said second inert liquids while simultaneously monitoring the device temperature until it again reaches the desired device temperature.

20. The method of claim 5 further comprising the step of:

adding, incrementally, to the bath one of said first and said second inert liquids to selectively modify the rate of nucleate boiling of the mixture of said first and said second inert liquids while simultaneously monitoring the device case temperature until it again reaches the desired device case temperature.

* * * * *